(12) United States Patent  
Morita (10) Patent No.: US 6,629,160 B1
(45) Date of Patent: Sep. 30, 2003

(54) DIRECT MEMORY ACCESS CONTROLLER

(75) Inventor: Yutaka Morita, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 348 days.

(21) Appl. No.: 09/592,865

(22) Filed: Jun. 13, 2000

(30) Foreign Application Priority Data

Jun. 16, 1999 (JP) .......................................... 11-170165

(51) Int. Cl.[7] .............................................. G06F 13/28
(52) U.S. Cl. ...................... 710/22; 712/225; 711/111; 711/169
(58) Field of Search ...................... 710/1, 22, 23–26, 710/36, 107; 712/221, 225; 711/111, 169

(56) References Cited

U.S. PATENT DOCUMENTS

| | | | | |
|---|---|---|---|---|
| 4,093,823 A | * | 6/1978 | Chu .......................... | 179/15 |
| 5,175,841 A | * | 12/1992 | Magar et al. ............... | 395/425 |
| 5,313,607 A | * | 5/1994 | Tokumaru ................... | 395/425 |
| 5,623,622 A | * | 4/1997 | Yuki et al. ................. | 711/100 |
| 5,696,989 A | * | 12/1997 | Miura et al. ............... | 395/844 |
| 6,324,599 B1 | * | 11/2001 | Zhou et al. ................. | 710/26 |
| 6,453,368 B2 | * | 9/2002 | Yamamoto ................... | 710/27 |

FOREIGN PATENT DOCUMENTS

| | | |
|---|---|---|
| DE | 691 27 771 T2 | 10/1997 |
| EP | 0 458 625 B1 | 10/1997 |
| JP | 61-148563 | 7/1986 |
| JP | 63-53681 | 3/1988 |
| JP | 1-114960 | 5/1989 |
| JP | 4-333951 | 11/1992 |
| JP | 6-4458 | 1/1994 |
| JP | 11-110339 | 4/1999 |

* cited by examiner

*Primary Examiner*—Jeffrey Gaffin
(74) *Attorney, Agent, or Firm*—Young & Thompson (57) ABSTRACT

The present invention provides a direct memory access controller used for carrying out a direct memory access transfer of data from a first memory to a second memory, wherein the direct memory access controller has a modulo address arithmetic unit for executing a modulo adjustment to transfer addresses of the first memory by computing a top transfer address of a next transfer datum which should be transferred following to a previously transferred datum which has been stored at a higher address than an address at which the next transfer datum is stored in the first memory, so that the direct memory access controller allows a continuous transfer of all of required data.

15 Claims, 9 Drawing Sheets

| transfer word no. 1 | external memory address | internal memory address | image data | |
|---|---|---|---|---|
| 0012h | 0000h | 0000h | a | |
| 0011h | 0003h | 0001h | b | |
| 0010h | 0006h | 0002h | c | |
| 000fh | 0009h | 0003h | d | |
| 000eh | 000ch | 0004h | e | |
| 000dh | 000fh | 0005h | f | |
| 000ch | 0001h (0012h) | 0006h | g | modulo adjustment |
| 000bh | 0004h | 0007h | h | modulo value : 0011h |
| 000ah | 0007h | 0008h | i | |
| 0009h | 000ah | 0009h | j | |
| 0008h | 000dh | 000ah | k | |
| 0007h | 0010h | 000bh | l | |
| 0006h | 0002h (0013h) | 000ch | m | modulo adjustment |
| 0005h | 0005h | 000dh | n | modulo value : 0011h |
| 0004h | 0008h | 000eh | o | |
| 0003h | 000bh | 000fh | p | |
| 0002h | 000eh | 0010h | q | |
| 0001h | 0011h | 0011h | r | |

() represents an external; memory address prior to modulo adjustment

FIG. 6

DEADDR : external memory address register
DIADDR : internal memory address register
DOFF1 : off-set 1 register
DMDR : modulo register
DW1R : transfer word No. 1 register
DTRANS : data transfer
DMDA : modulo adjustment

FIG. 7

19: image data

12: external memory

13: internal memory

FIG. 8

| transfer word no. 2 | transfer word no. 1 | external memory address | internal memory address | image data |
|---|---|---|---|---|
| 0003h | 0003h | 0003h | 0000h | b |
| 0003h | 0002h | 0006h | 0001h | c |
| 0003h | 0001h | 0009h | 0002h | d |
| 0002h | 0003h | 0004h (0015h) | 0003h | h modulo adjustment |
| 0002h | 0002h | 0007h | 0004h | i modulo value : 0011h |
| 0002h | 0001h | 000ah | 0005h | j |
| 0001h | 0003h | 0005h (0016h) | 0006h | n modulo adjustment |
| 0001h | 0002h | 0008h | 0007h | o modulo value : 0011h |
| 0001h | 0001h | 000bh | 0008h | p |

() represents an external; memory address prior to modulo adjustment

DIRECT MEMORY ACCESS CONTROLLER

BACKGROUND OF THE INVENTION

The present invention relates to a direct memory access controller and a method of controlling the direct memory access, and more particularly to a direct memory access controller suitable for an image processor and a method of controlling the direct memory access.

Figure 1:
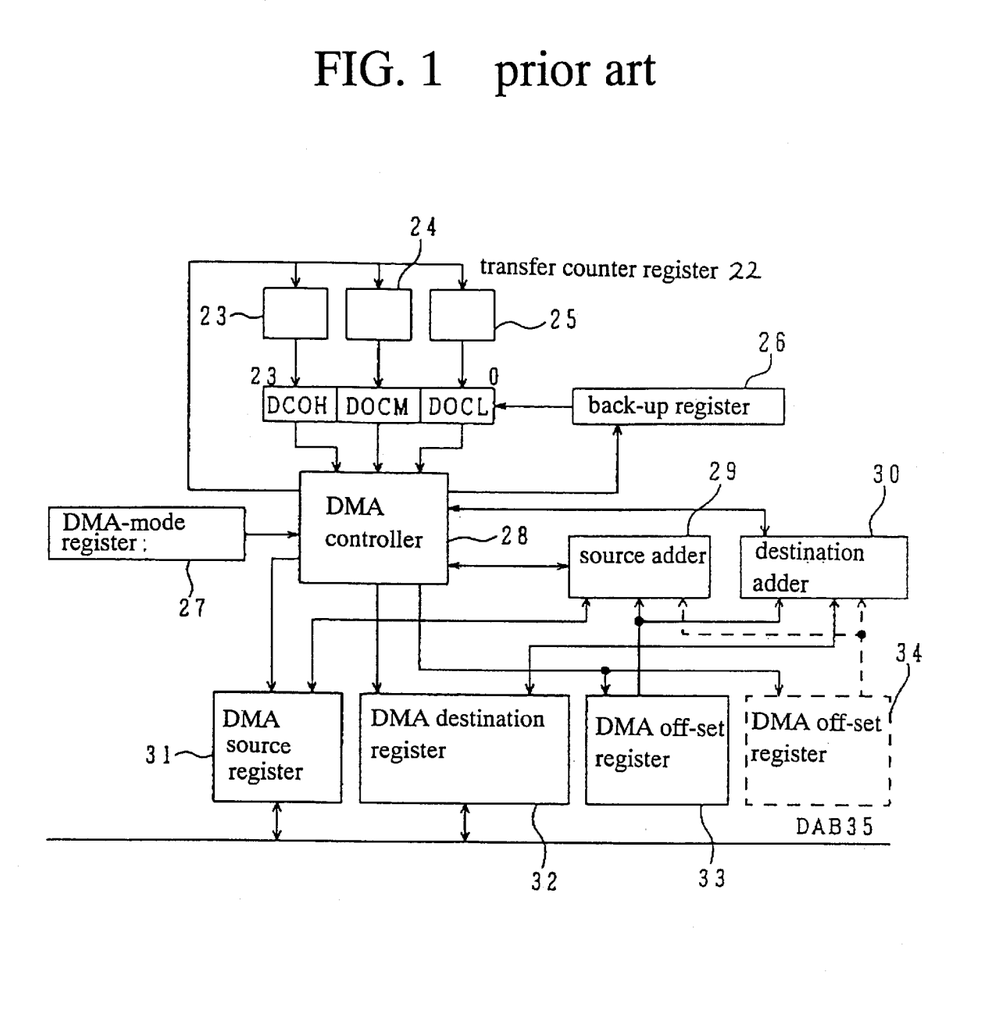
FIG. 1 is a block diagram illustrative of the conventional direct access memory controller.

The direct memory access controller so operates that after a single direct memory access transfer has been finished, then a direct memory access transfer end interrupt to a CPU is outputted and then a top address for the next region is re-set for the direct memory access transfer. For this reason, an over-head of the program appears. FIG. 1 is a block diagram illustrative of the conventional direct access memory controller. This conventional direct access memory controller is disclosed in Japanese laid-open patent publication No. 8-221353.

The above conventional direct access memory controller is capable of a unidirectional transfer from a lower address to an upper address. If image data on the memory are processed, the over-heads of the programs are frequently caused, whereby it is difficult to realize an efficient operation.

In the above circumstances, it had been required to develop a novel direct access memory controller and a method of controlling a direct access memory free from the above problem.

SUMMARY OF THE INVENTION

Accordingly, it is an object of the present invention to provide a novel direct access memory controller free from the above problems.

It is a further object of the present invention to provide a novel direct access memory controller free from overhead of the program.

It is a still further object of the present invention to provide a novel direct access memory controller capable of efficient data transfer.

It is further more object of the present invention to provide a novel method of controlling a direct access memory free from the above problems.

It is moreover object of the present invention to provide a novel method of controlling a direct access memory free from overhead of the program.

It is another object of the present invention to provide a novel method of controlling a direct access memory capable of efficient data transfer.

The present invention provides a direct memory access controller used for carrying out a direct memory access transfer of data from a first memory to a second memory, wherein the direct memory access controller has a modulo address arithmetic unit for executing a modulo adjustment to transfer addresses of the first memory by computing a top transfer address of a next transfer datum which should be transferred following to a previously transferred datum which has been stored at a higher address than an address at which the next transfer datum is stored in the first memory, so that the direct memory access controller allows a continuous transfer of all of required data.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

DISCLOSURE OF THE INVENTION

The first present invention provides a direct memory access controller used for carrying out a direct memory access transfer of data from a first memory to a second memory, wherein the direct memory access controller has a modulo address arithmetic unit for executing a modulo adjustment to transfer addresses of the first memory by computing a top transfer address of a next transfer datum which should be transferred following to a previously transferred datum which has been stored at a higher address than an address at which the next transfer datum is stored in the first memory, so that the direct memory access controller allows a continuous transfer of all of required data.

It is preferable that the modulo address arithmetic unit subtracts a predetermined modulo value of a modulo register from a next transfer address of the first memory if a value of the next transfer address of the first memory is higher than the predetermined modulo value.

It is also preferable that the modulo address arithmetic unit is connected to a selector which is also connected to a normal address arithmetic unit, so that the selector selects the modulo address arithmetic unit to execute the subtraction operation only when the value of the next transfer address of the first memory is higher than the predetermined modulo value.

The second present invention provides a direct memory access controller used for carrying out a direct memory access transfer of data from a first memory to a second memory, wherein the direct memory access controller comprises: a first means for carrying out a normal direct memory transfer of data from a first memory to a second memory in a predetermined sequence and in a direction from a lower address to a higher address; and a second means for carrying out a modulo adjustment to transfer addresses of the first memory by computing a top transfer address of a next transfer datum which should be transferred following to a previously transferred datum which has been stored at a higher address than an address at which the next transfer datum is stored in the first memory, so that the first means allows a continuous transfer of all of required data.

It is preferable that the modulo adjustment is carried out by subtracting a predetermined modulo value of a modulo register from a next transfer address of the first memory if a value of the next transfer address of the first memory is higher than the predetermined modulo value.

It is also preferable that the second means is connected to a third means for selecting one of the first and second means, and the third means is also connected to the first means, so that the third means selects the modulo address arithmetic unit to execute the subtraction operation only when the value of the next transfer address of the first memory is higher than the predetermined modulo value.

The third present invention provides a method of controlling a direct memory access controller used for carrying out a direct memory access transfer of data from a first memory to a second memory. The method comprises the steps of: carrying out a normal direct memory transfer of data from a first memory to a second memory in a predetermined sequence and in a direction from a lower address to a higher address; and carrying out a modulo adjustment to transfer addresses of the first memory by computing a top transfer address of a next transfer datum which should be transferred following to a previously transferred datum which has been stored at a higher address than an address at which the next transfer datum is stored in the first memory, so that the first means allows a continuous transfer of all of required data.

It is preferable that the modulo adjustment is carried out by subtracting a predetermined modulo value of a modulo register from a next transfer address of the first memory if a value of the next transfer address of the first memory is higher than the predetermined modulo value.

It is also preferable that the subtraction operation is carried out only when the value of the next transfer address of the first memory is higher than the predetermined modulo value.

PREFERRED EMBODIMENT

First Embodiments

Figure 2:
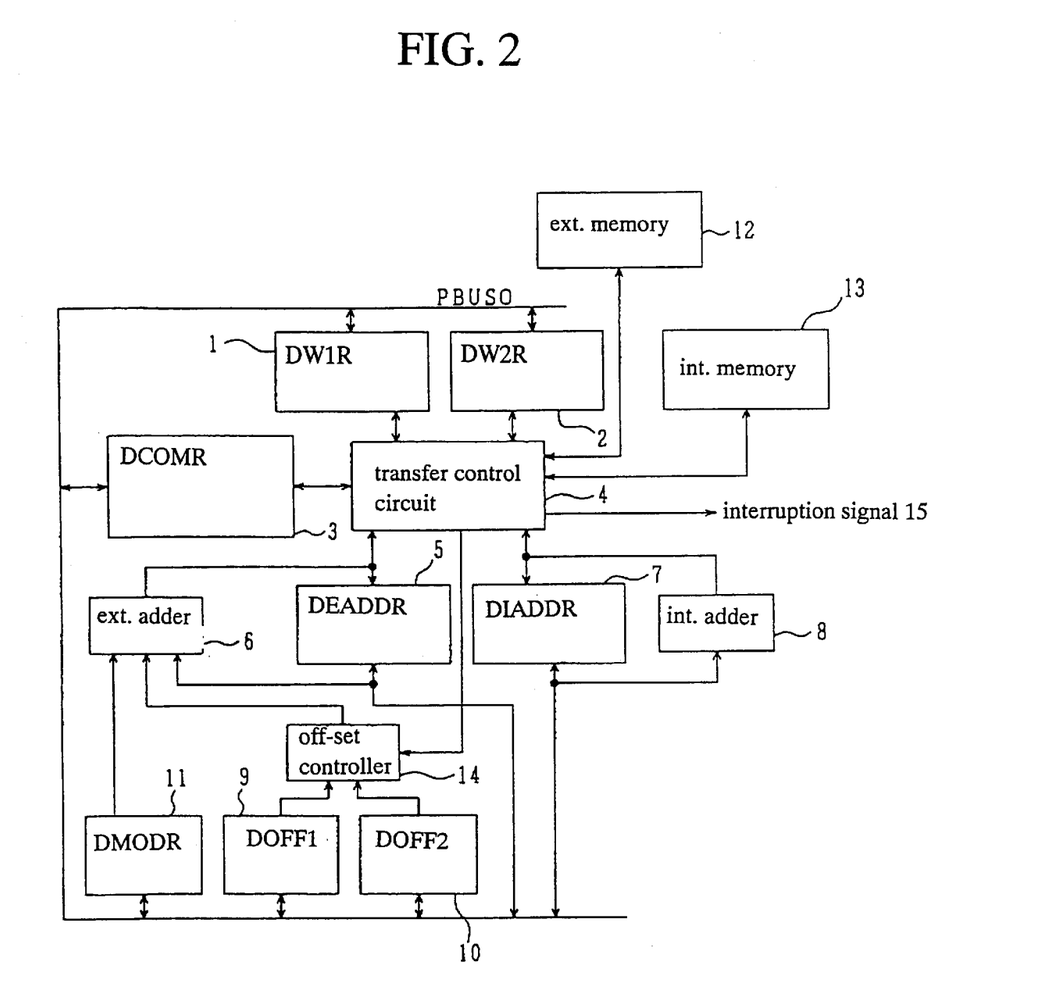
FIG. 2 is a block diagram illustrative of a first novel direct memory access controller in a first embodiment in accordance with the present invention.
Figure 3:
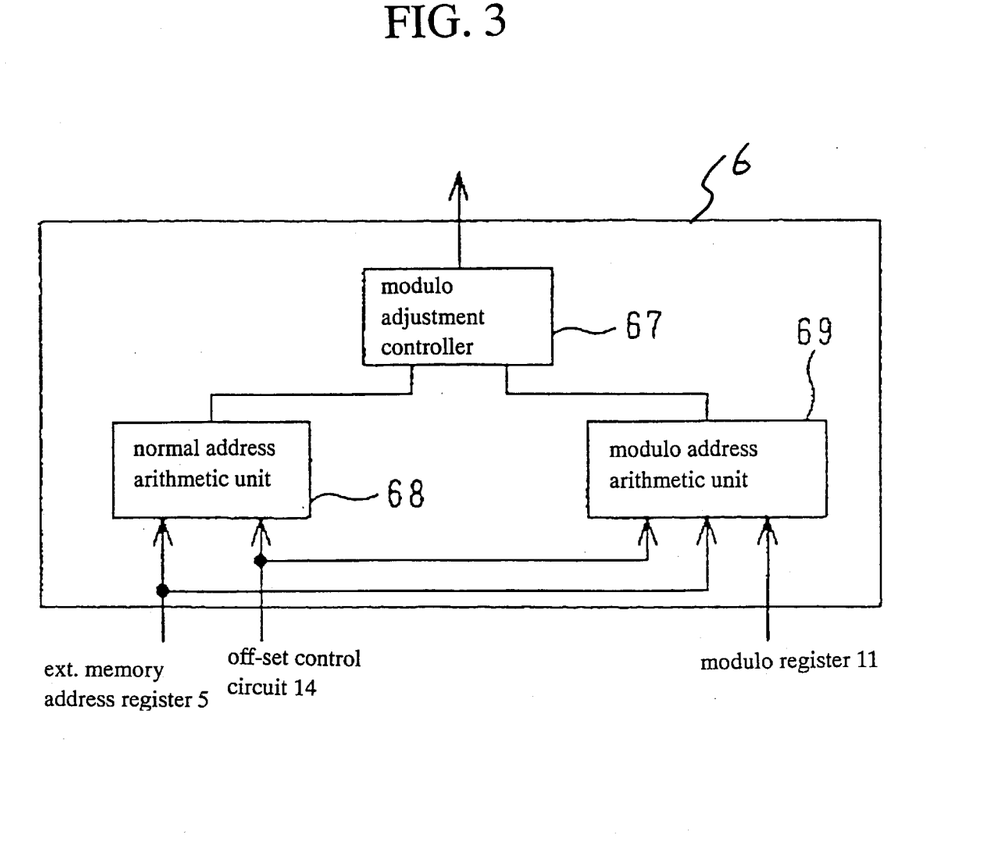
FIG. 3 is a block diagram illustrative of an external address adder provided in the first novel direct memory access controller of FIG. 2.

A first embodiment according to the present invention will be described in detail with reference to the drawings. FIG. 2 is a block diagram illustrative of a first novel direct memory access controller in a first embodiment in accordance with the present invention. FIG. 3 is a block diagram illustrative of an external address adder provided in the first novel direct memory access controller of FIG. 2.

The direct memory access controller comprises the following circuit configuration as shown in FIG. 2. A transfer word number 1 register 1 is provided to be connected to a data bus PBUSO. A transfer word number 2 register 2 is also provided to be connected to the data bus PBUSO. A direct memory access transfer control register 3 is also provided to be connected to the data bus PBUSO. A transfer control circuit 4 is also provided which is connected in parallel to the transfer word number 1 register 1, the transfer word number 2 register 2 and the direct memory access transfer control register 3, An external memory address register 5 is provided which is connected to the transfer control circuit 4. An external address adder 6 is provided which is connected to the transfer control circuit 4. An internal memory address register 7 is provided which is connected to the transfer control circuit 4. An internal address adder 8 is provided which is connected to the transfer control circuit 4. An off-set 1 register 9 is provided which is connected to the data bus PBUSO. An off-set 2 register 10 is also provided which is connected to the data bus PBUSO. A modulo register 11 is provided which is connected to the data bus PBUSO and also connected to the external address adder 6. An external memory 12 is provided which is connected to the transfer control circuit 4. An internal memory 13 is provided which is connected to the transfer control circuit 4. An off-set control circuit 14 is provided which is connected to the external address adder 6, the transfer control circuit 4, the off-set 1 register 9 and the off-set 2 register 10. An interruption signal is supplied from the transfer control circuit 4.

As shown in FIG. 3, the external address adder 6 has a circuit configuration as follows, The external address adder 6 comprises the modulo adjustment control circuit 67, the normal address arithmetic unit 68 and the modulo address arithmetic unit 69. The modulo adjustment control circuit 67 is connected to the external memory address register 5 and the off-set control circuit 14. The modulo address arithmetic unit 69 is also connected to the external memory address register 5 and the off-set control circuit 14 as well as connected to the modulo register 11. The modulo adjustment control circuit 67 is connected to the normal address arithmetic unit 68 and the modulo address arithmetic unit 69. The modulo adjustment control circuit 67 is also connected to the transfer control circuit 4 and the external memory address register 5. The normal address arithmetic unit 68 is provided for executing an address arithmetic for the addresses of the external memory 12 for data transfer in the sequence of the normal direction from the lower address to the higher address of the external memory 12. The modulo address arithmetic unit 69 is provided for executing a top transfer address arithmetic for the top transfer address located lower than the finally transferred data address to back the transfer address to the top transfer address in the reverse direction from the high address to the low address for allowing subsequent data transfer in the alphabetical order in the normal direction from the lower address to the higher address by use of the normal address arithmetic unit 68. The modulo adjustment control circuit 67 is provided for selecting one of the normal and modulo address arithmetic units 68 and 69 for accomplishment of the continuous data transfer for all image data in the alphabetical order.

Figure 4:
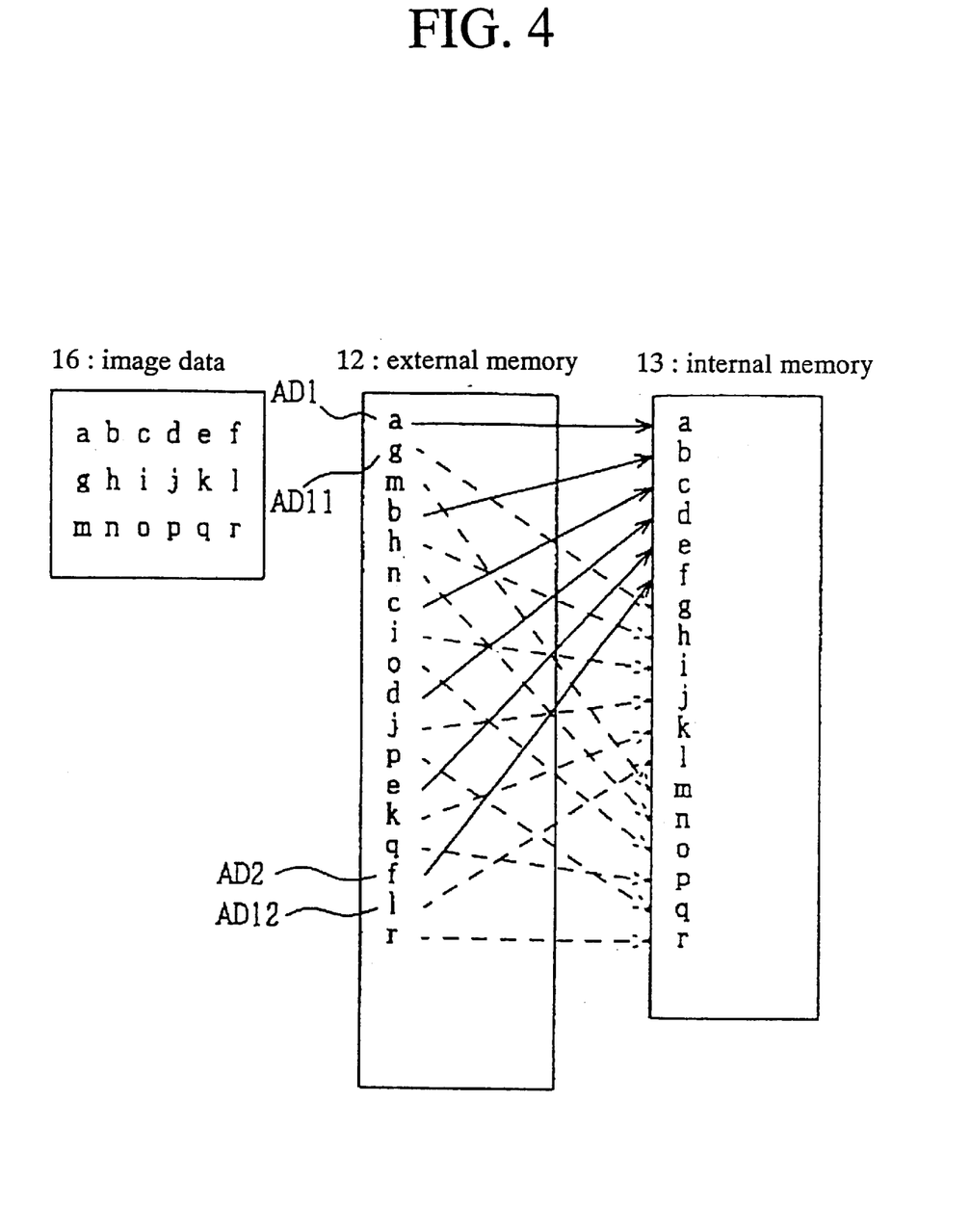
FIG. 4 is a diagram illustrative of a data transfer by the first novel direct memory access controller of FIG. 2.

The first novel direct memory access controller is operated to control a direct memory access operation for transferring data on a first memory 12 as an external memory to a second memory 13 as an internal memory. Data on the external memory 12 are transferred to the internal memory 13 in accordance with a predetermined sequence to realize a predetermined image display. FIG. 4 is a diagram illustrative of a data transfer by the first novel direct memory access controller of FIG. 2.

With reference to FIG. 4, image data 16 are transferred from the external memory 12 to the internal memory 13 by the first novel direct memory access controller in the predetermined sequence to realize the image display. In order to make it easy to understand how data on the external memory should be transferred to the internal memory for realizing the image display, it is assumed that eighteen of image-content datum are necessary to display a unit of the image to be displayed. The image data 16 comprise eighteen of image-content datum which represent, eighteen alphabets "a", "b", –"r". Alphabets are used for making it easy to understand how the eighteen image data should be ordered from the low address to the high address in the internal memory 13, so that the eighteen image data are read out from the internal memory 13 in the order from the low address to the high address sequentially for realizing the image display. The image data 16 are stored in the external memory 12, wherein the image data 16 are alphabetically disordered from the low address to the high address but in accordance with a predetermined regulation. Namely, the image data 16 are stored in the external memory 12 in the different order from the alphabetical order necessary for realizing the image display. If the image data are simply transferred from the external memory 12 to the internal memory 13 in accordance with the order of the external memory 12, for example, in the order from the low address to the high address of the external memory 12, then the required image display could bot accomplished. Namely, the image data 16 are stored in the external memory 12 in the predetermined regulation but different from the order necessary for realizing the image display.

For the above reasons, in the direct memory access, it is necessary to adjust the transfer order for transferring the image data from the external memory 12 to the internal memory 13, so that the image data on the internal memory 13 are alphabetically ordered from the low address to the high address for realizing the image display. In the external memory 12, the image data "a", "b", "c", "d", "e", and "f" are sequentially transferred, without adjustment to the transfer order, in the alphabetical order to the internal memory 13 in accordance with the direction from the low address to the high address. However, the image datum "g" is stored at the lower address than the image datum "f" in the external memory 12, for which reason in order to transfer the image datum "g", it is necessary to back to a next top transfer address for next-transferring the image datum which is located lower than the finally transferred address of the image datum "f", so that the further image data "g", "h", "i", "j", "k", and "l" are sequentially transferred in the alphabetical order to the internal memory 13 in accordance with the direction from the low address to the high address of the external memory 12. However, the image datum "m" is stored at the lower address than the image datum "l" in the external memory 12, for which reason in order to transfer the image datum "m", it is necessary to back to a second next top transfer address for second next-transferring the image datum which is located lower than the finally transferred address of the image datum "l", so that the further image data "m", "n", "o", "p", "q", and "r" are sequentially transferred in the alphabetical order to the internal memory 13 in accordance with the order from the low address to the high address of the external memory 12.

The present invention is to improve the direct memory access controller for image data transfer from the external memory 12 to the internal memory 13, so that the image data, which are alphabetically disordered in the external memory 12 in the direction from the low address to the high address, are transferred in the adjusted-transfer order to the internal memory 13 so that the transferred image data are alphabetically ordered in the direction from the low address to the high address of the internal memory 13 for accomplishing the perfect image display.

In order to realize the adjustment to the transfer order, an address controller is provided for executing a top transfer address arithmetic, which is located lower than a final address for a finally transferred datum and which has a next datum to be subsequently transferred, so that a previous data-transfer in the alphabetical order in the direction from the low address to the high address is followed by a next data-transfer in the alphabetical order in the direction from the low address to the high address, whereby the image data, which are alphabetically disordered in the external memory 12 in the direction from the low address to the high address, are transferred in the adjusted-transfer order adjusted by the address controller to the internal memory 13 so that the transferred image data are alphabetically ordered in the direction from the low address to the high address of the internal memory 13.

The address controller for executing the top transfer address arithmetic has the following circuit configurations. Namely, the address controller has normal and modulo address arithmetic units 68 and 69 and a modulo adjustment control circuit 67. The normal address arithmetic unit 68 is provided for executing an address arithmetic for the addresses of the external memory 12 for data transfer in the sequence of the normal direction from the lower address to the higher address of the external memory 12. The modulo address arithmetic unit 69 is provided for executing a top transfer address arithmetic for the top transfer address located lower than the finally transferred data address to back the transfer address to the top transfer address in the reverse direction from the high address to the low address for allowing subsequent data transfer in the alphabetical order in the normal direction from the lower address to the higher address by use of the normal address arithmetic unit 68. The modulo adjustment control circuit 67 is provided for selecting one of the normal and modulo address arithmetic units 68 and 69 for accomplishment of the continuous data transfer for all data in the alphabetical order.

An initial value is set in the direct memory access control register 3 so as to enable the transfer control circuit 4 to control the direct memory access transfer of the image data in a transfer mode decided by the value of the direct memory access transfer control register 3. An address of the external memory 12 to be used for the direct memory access transfer is decided by the external address adder 6. An address of the internal memory 13 to be used for the direct memory access transfer is decided by the internal address adder 8. The external address adder 6 is connected to the external memory address register 5, the off-set control circuit 14 and the modulo register 11, so that the external address adder 6 adds a value of the external memory address register 5 with a controlled value controlled by the off-set control circuit 14 unless the value of the external memory address register 5 does not exceed the value of the modulo register 11. The off-set control circuit 14 is connected to the off-set 1 register 9 and the off-set register 10, so that the off-set control circuit 14 selects one of the values of the off-set 1 register 9 and the off-set register 10 in accordance with a control signal from the transfer control circuit 4. If the value of the external memory address register 5 exceeds the value of the modulo register 11, then an modulo adjustment is carried out for adjustment to the address to decide the external memory address, The internal memory address adder 8 is connected to the internal memory address register 7 so that the internal memory address adder 8 executes an increment of the value of the internal memory address register 7.

Figure 5:
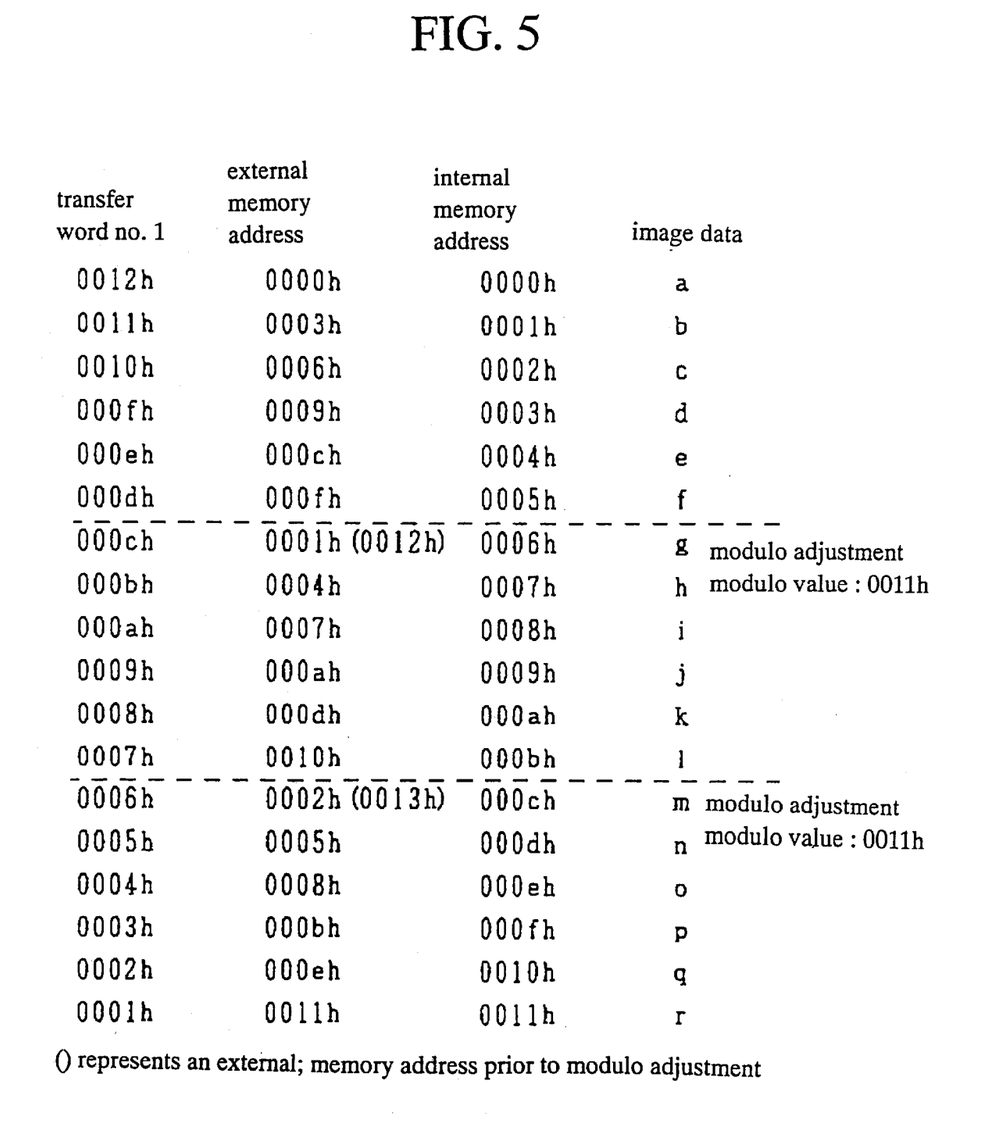
FIG. 5 is a view illustrative of correspondences of individual eighteen image data, internal memory addresses, external memory addresses and transfer word number 1 register to explain transfer operations of the normal data transfer and modulo adjustment operations.

FIG. 5 is a view illustrative of correspondences of individual eighteen image data, internal memory addresses, external memory addresses and transfer word number 1 register to explain transfer operations of the normal data transfer and modulo adjustment operations.

Operations of the novel direct memory access control unit of FIGS. 2 and 3 will be described with reference to FIGS. 4 and 5. The following descriptions will be made assuming that the image data 16 have been stored in the external memory 12 as shown in FIG. 4. The image data 16 are transferred to the internal memory 13 in the alphabetical order. As shown in FIG. 5, initial values are so set that the external memory address register 5 is 0000h, the internal memory address register 7 is 000h, the off-set 1 register 9 is 0003h, the transfer word number 1 register 1: 0012h, the modulo register 11 is 0011h, the direct memory access transfer control register 3 is 0001h.

In the external memory address 12, an image datum "a" is stored at an address represented by "0000h" of the external memory address register 5. This image datum "a" is transferred to the internal memory 13 at an address represented by "0000h" of the internal memory address register 7. After the transfer of the image datum "a" has been completed, then the transfer control circuit 4 executes a decrement or a one-time down-count to the value of the transfer word number 1 register 1, whereby the value of the transfer word number 1 register 1 becomes 0011h. Further, the external address adder 6 adds the value of the external memory address register 5 with the value of the off-set 1 register 9 selected by the off-set control circuit 14, whereby the value of the external memory address register 5 becomes 0003h. Further more, the internal address adder 8 increments the value of the internal memory address register 7, whereby the value of the internal memory address register 7 becomes 0001h. Thereafter, the image data "b" stored at the external memory address 0003h represented by the external memory address register 5 is then transferred to the internal memory address 0001h represented by the internal memory address register 7. Since the value of the external memory address register 5 is still smaller than the modulo value 0011h, the same operation will be repeated.

Namely, after the transfer of the image datum "b" has been completed, then the transfer control circuit 4 executes a decrement or a one-time down-count to the value of the transfer word number 1 register 1, whereby the value of the transfer word number 1 register 1 becomes 0010h. Further, the external address adder 6 adds the value of the external memory address register 5 with the value of the off-set 1 register 9 selected by the off-set control circuit 14, whereby the value of the external memory address register 5 becomes 0006h. Further more, the internal address adder 8 increments the value of the internal memory address register 7, whereby the value of the internal memory address register 7 becomes 0002h. Thereafter, the image data "c" stored at the external memory address 0006h represented by the external memory address register 5 is then transferred to the internal memory address 0002h represented by the internal memory address register 7. Since the value of the external memory address register 5 is still smaller than the modulo value 0011h, the same operation will be repeated.

Namely, after the transfer of the image datum "c" has been completed, then the transfer control circuit 4 executes a decrement or a one-time down-count to the value of the transfer word number 1 register 1, whereby the value of the transfer word number 1 register 1 becomes 000fh. Further, the external address adder 6 adds the value of the external memory address register 5 with the value of the off-set 1 register 9 selected by the off-set control circuit 14, whereby the value of the external memory address register 5 becomes 0009h. Further more, the internal address adder 8 increments the value of the internal memory address register 7, whereby the value of the internal memory address register 7 becomes 0003h. Thereafter, the image data "d" stored at the external memory address 0009h represented by the external memory address register 5 is then transferred to the internal memory address 0003h represented by the internal memory address register 7. Since the value of the external memory address register 5 is still smaller than the modulo value 0011h, the same operation will be repeated.

Namely, after the transfer of the image datum "d" has been completed, then the transfer control circuit 4 executes a decrement or a one-time down-count to the value of the transfer word number 1 register 1, whereby the value of the transfer word number 1 register 1 becomes 000eh. Further, the external address adder 6 adds the value of the external memory address register 5 with the value of the off-set 1 register 9 selected by the off-set control circuit 14, whereby the value of the external memory address register 5 becomes 000ch. Further more, the internal address adder 8 increments the value of the internal memory address register 7, whereby the value of the internal memory address register 7 becomes 0004h. Thereafter, the image data "e" stored at the external memory address 000ch represented by the external memory address register 5 is then transferred to the internal memory address 0004h represented by the internal memory address register 7. Since the value of the external memory address register 5 is still smaller than the modulo value 0011h, the same operation will be repeated.

Namely, after the transfer of the image datum "e" has been completed, then the transfer control circuit 4 executes a decrement or a one-time down-count to the value of the transfer word number 1 register 1, whereby the value of the transfer word number 1 register 1 becomes 000dh. Further, the external address adder 6 adds the value of the external memory address register 5 with the value of the off-set 1 register 9 selected by the off-set control circuit 14, whereby the value of the external memory address register 5 becomes 000fh. Further more, the internal address adder 8 increments the value of the internal memory address register 7, whereby the value of the internal memory address register 7 becomes 0005h. Thereafter, the image data "f" stored at the external memory address 000fh represented by the external memory address register 5 is then transferred to the internal memory address 0005h represented by the internal memory address register 7. Since the value of the external memory address register 5 is still smaller than the modulo value 0011h, the same operation will be repeated.

Namely, after the transfer of the image datum "f" has been completed, then the transfer control circuit 4 executes a decrement or a one-time down-count to the value of the transfer word number 1 register 1, whereby the value of the transfer word number 1 register 1 becomes 000ch. Further, the external address adder 6 adds the value of the external memory address register 5 with the value of the off-set 1 register 9 selected by the off-set control circuit 14, whereby the value of the external memory address register 5 becomes 0012h. Further more, the internal address adder 8 increments the value of the internal memory address register 7, whereby the value of the internal memory address register 7 becomes 0006h. The value of the external memory address register 5 becomes beyond the modulo value 0011h, whereby the external address adder 6 executes such a modulo adjustment that the modulo value 0011h is subtracted from the value 0012h of the external memory address register 5 to obtain a subtracted value 0001h which designates the external memory address as the top transfer address at which the next-transfer image data "g" is stored. Thus, the image data "g" stored at the top transfer address 0001h as the external memory address is then transferred to the internal memory address 0006h represented by the internal memory address register 7. Since the value of the external memory address register 5 after the modulo adjustment becomes smaller than the modulo value 0011h, the same operation will be repeated Namely, after the transfer of the image datum "g" has been completed, then the transfer control circuit 4 executes a decrement or a one-time down-count to the value of the transfer word number 1 register 1, whereby the value of the transfer word number 1 register 1 becomes 000bh. Further, the external address adder 6 adds the value of the external memory address register 5 with the value of the off-set 1 register 9 selected by the off-set control circuit 14, whereby the value of the external memory address register 5 becomes 0004h. Further more, the internal address adder 8 increments the value of the internal memory address register 7, whereby the value of the internal memory address register 7 becomes 0007h. Thereafter, the image data "h" stored at the external memory address 0004h represented by the external memory address register 5 is then transferred to the internal memory address 0007h represented by the internal memory address register 7. Since the value of the external memory address register 5 is still smaller than the modulo value 0011h, the same operation will be repeated.

Namely, after the transfer of the image datum "h" has been completed, then the transfer control circuit 4 executes a decrement or a one-time down-count to the value of the transfer word number 1 register 1, whereby the value of the transfer word number 1 register 1 becomes 000ah. Further, the external address adder 6 adds the value of the external memory address register 5 with the value of the off-set 1 register 9 selected by the off-set control circuit 14, whereby the value of the external memory address register 5 becomes 0007h. Further more, the internal address adder 8 increments the value of the internal memory address register 7, whereby the value of the internal memory address register 7 becomes 0008h. Thereafter, the image data "i" stored at the external memory address 0007h represented by the external memory address register 5 is then transferred to the internal memory address 0008h represented by the internal memory address register 7. Since the value of the external memory address register 5 is still smaller than the modulo value 0011h, the same operation will be repeated.

Namely, after the transfer of the image datum "i" has been completed, then the transfer control circuit 4 executes a decrement or a one-time down-count to the value of the transfer word number 1 register 1, whereby the value of the transfer word number 1 register 1 becomes 0009h. Further, the external address adder 6 adds the value of the external memory address register 5 with the value of the off-set 1 register 9 selected by the off-set control circuit 14, whereby the value of the external memory address register 5 becomes 000ah. Further more, the internal address adder 8 increments the value of the internal memory address register 7, whereby the value of the internal memory address register 7 becomes 0009h. Thereafter, the image data "j" stored at the external memory address 000ah represented by the external memory address register 5 is then transferred to the internal memory address 0009h represented by the internal memory address register 7. Since the value of the external memory address register 5 is still smaller than the modulo value 0011h, the same operation will be repeated.

Namely, after the transfer of the image datum "j" has been completed, then the transfer control circuit 4 executes a decrement or a one-time down-count to the value of the transfer word number 1 register 1, whereby the value of the transfer word number 1 register 1 becomes 0008h. Further, the external address adder 6 adds the value of the external memory address register 5 with the value of the off-set 1 register 9 selected by the off-set control circuit 14, whereby the value of the external memory address register 5 becomes 000dh. Further more, the internal address adder 8 increments the value of the internal memory address register 7, whereby the value of the internal memory address register 7 becomes 000ah. Thereafter, the image data "k" stored at the external memory address 000dh represented by the external memory address register 5 is then transferred to the internal memory address 000ah represented by the internal memory address register 7. Since the value of the external memory address register 5 is still smaller than the modulo value 0011h, the same operation will be repeated.

Namely, after the transfer of the image datum "k" has been completed, then the transfer control circuit 4 executes a decrement or a one-time down-count to the value of the transfer word number 1 register 1, whereby the value of the transfer word number 1 register 1 becomes 0007h. Further, the external address adder 6 adds the value of the external memory address register 5 with the value of the off-set 1 register 9 selected by the off-set control circuit 14, whereby the value of the external memory address register 5 becomes 0010h. Further more, the internal address adder 8 increments the value of the internal memory address register 7, whereby the value of the internal memory address register 7 becomes 000bh. Thereafter, the image data "l" stored at the external memory address 0010h represented by the external memory address register 5 is then transferred to the internal memory address 000bh represented by the internal memory address register 7. Since the value of the external memory address register 5 is still smaller than the modulo value 0011h, the same operation will be repeated.

Namely, after the transfer of the image datum "l" has been completed, then the transfer control circuit 4 executes a decrement or a one-time downcount to the value of the transfer word number 1 register 1, whereby the value of the transfer word number 1 register 1 becomes 0006h. Further, the external address adder 6 adds the value of the external memory address register 5 with the value of the off-set 1 register 9 selected by the off-set control circuit 14, whereby the value of the external memory address register 5 becomes 0013h. Further more, the internal address adder 8 increments the value of the internal memory address register 7, whereby the value of the internal memory address register 7 becomes 000ch. The value of the external memory address register 5 again becomes beyond the modulo value 0011h, whereby the external address adder 6 again executes such the modulo adjustment that the modulo value 0011h is subtracted from the value 0013h of the external memory address register 5 to obtain a subtracted value 0002h which designates the external memory address as the top transfer address at which the next-transfer image data "m" is stored. Thus, the image data "m" stored at the top transfer address 0002h as the external memory address is then transferred to the internal memory address 000ch represented by the internal memory address register 7. Since the value of the external memory address register 5 after the modulo adjustment becomes smaller than the modulo value 0011h, the same operation will be repeated.

Namely, after the transfer of the image datum "m" has been completed, then the transfer control circuit 4 executes a decrement or a one-time down-count to the value of the transfer word number 1 register 1, whereby the value of the transfer word number 1 register 1 becomes 0005h. Further, the external address adder 6 adds the value of the external memory address register 5 with the value of the off-set 1 register 9 selected by the off-set control circuit 14, whereby the value of the external memory address register 5 becomes 0005h. Further more, the internal address adder 8 increments the value of the internal memory address register 7, whereby the value of the internal memory address register 7 becomes 000dh. Thereafter, the image data "n" stored at the external memory address 0005h represented by the external memory address register 5 is then transferred to the internal memory address 000dh represented by the internal memory address register 7. Since the value of the external memory address register 5 is still smaller than the modulo value 0011h, the same operation will be repeated.

Namely, after the transfer of the image datum "n" has been completed, then the transfer control circuit 4 executes a decrement or a one-time down-count to the value of the transfer word number 1 register 1, whereby the value of the transfer word number 1 register 1 becomes 0004h. Further, the external address adder 6 adds the value of the external memory address register 5 with the value of the off-set 1 register 9 selected by the off-set control circuit 14, whereby the value of the external memory address register 5 becomes 0008h. Further more, the internal address adder 8 increments the value of the internal memory address register 7, whereby the value of the internal memory address register 7 becomes 000eh. Thereafter, the image data "o" stored at the external memory address 0008h represented by the external memory address register 5 is then transferred to the internal memory address 000eh represented by the internal memory address register 7. Since the value of the external memory address register 5 is still smaller than the modulo value 0011h, the same operation will be repeated.

Namely, after the transfer of the image datum "o" has been completed, then the transfer control circuit 4 executes a decrement or a one-time down-count to the value of the transfer word number 1 register 1, whereby the value of the transfer word number 1 register 1 becomes 0003h. Further, the external address adder 6 adds the value of the external memory address register 5 with the value of the off-set 1 register 9 selected by the off-set control circuit 14, whereby the value of the external memory address register 5 becomes 000bh. Further more, the internal address adder 8 increments the value of the internal memory address register 7, whereby the value of the internal memory address register 7 becomes 000fh. Thereafter, the image data "p" stored at the external memory address 000bh represented by the external memory address register 5 is then transferred to the internal memory address 000fh represented by the internal memory address register 7. Since the value of the external memory address register 5 is still smaller than the modulo value 0011h, the same operation will be repeated.

Namely, after the transfer of the image datum "p" has been completed, then the transfer control circuit 4 executes a decrement or a one-time down-count to the value of the transfer word number 1 register 1, whereby the value of the transfer word number 1 register 1 becomes 0002h. Further, the external address adder 6 adds the value of the external memory address register 5 with the value of the off-set 1 register 9 selected by the off-set control circuit 14, whereby the value of the external memory address register 5 becomes 000eh. Further more, the internal address adder 8 increments the value of the internal memory address register 7, whereby the value of the internal memory address register 7 becomes 0010h. Thereafter, the image data "q" stored at the external memory address 000eh represented by the external memory address register 5 is then transferred to the internal memory address 0010h represented by the internal memory address register 7. Since the value of the external memory address register 5 is still smaller than the modulo value 0011h, the same operation will be repeated.

Namely, after the transfer of the image datum "q" has been completed, then the transfer control circuit 4 executes a decrement or a one-time down-count to the value of the transfer word number 1 register 1, whereby the value of the transfer word number 1 register 1 becomes 0001h Further, the external address adder 6 adds the value of the external memory address register 5 with the value of the off-set 1 register 9 selected by the off-set control circuit 14, whereby the value of the external memory address register 5 becomes 0011h. Further more, the internal address adder 8 increments the value of the internal memory address register 7, whereby the value of the internal memory address register 7 becomes 0011h. Thereafter, the image data "r" stored at the external memory address 0011h represented by the external memory address register 5 is then transferred to the internal memory address 0011h represented by the internal memory address register 7. Since the value "0001h" of the transfer word number 1 register 1 is equal to 1, the above direct memory access transfer is completed The interruption signal is supplied from the transfer control circuit 4 to a CPU not illustrated, so that the CPU is informed of the completion of the direct memory access transfer.

If the value of the external address register 5 becomes beyond the modulo value 0011h of the modulo register 11, then the modulo adjustment control circuit 67 selects the modulo address arithmetic unit 69, so that the modulo address arithmetic unit 69 provides the external address such as "0001h" or "0002h" by the subtraction with the modulo value "0011h". The external address data provided by the modulo address arithmetic unit 69 is supplied to both the external address register 5 and he transfer control circuit 4. If the value of the external address register 5 remains smaller than the modulo value 0011h of the modulo register 11, then the modulo adjustment control circuit 67 selects the normal address arithmetic unit 68, so that the modulo address arithmetic unit 69 provides the external address. The external address data provided by the normal address arithmetic unit 68 is supplied to both the external address register 5 and he transfer control circuit 4.

Figure 6:
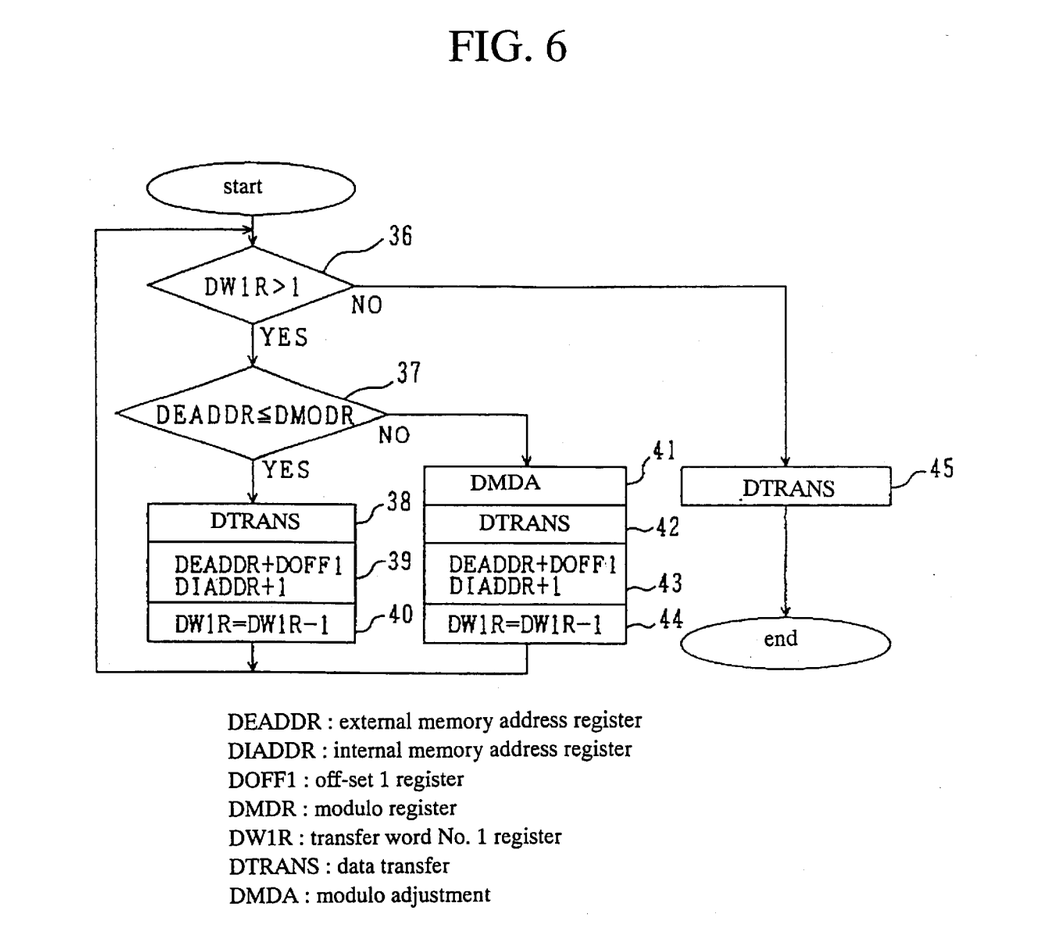
FIG. 6 is a flow chart illustrative of operations of the first novel direct memory access transfer controller of FIG. 2.

FIG. 6 is a flow chart illustrative of operations of the first novel direct memory access transfer controller of FIG. 2. As described above, in order to start the direct memory access transfer, the initial values are so set that the external memory address register 5 is 0000h, the internal memory address register 7 is 0000h, the off-set 1 register 9 is 0003h, the transfer word number 1 register 1: 0012h, the modulo register 11 is 0011h, the direct memory access transfer control register 3 is 0001h, whereby the direct memory access transfer is commenced.

In the first step 36, it is confirmed whether or not the value of the transfer word number 1 register (DW1R) 1 is more than 0. If the value is more than 0, then in the second step 37, it is further confirmed whether or not the value of the external memory address register (DEADDR) 5 is smaller or equal to the modulo value of the modulo register 11. If the value is smaller or equal to the modulo value, then in the third step 38, a data transfer is carried out. After the data transfer, in the step 39, the value of the off-set register (DOFF1) 9 is added with the value of the external memory address register (DEADDR) 5. Further, the value of the internal memory address register (DUADDR) 7 is incremented, thereby renewing the next transfer address. In the step 40, the decrement to the value of the transfer word number 1 register (DW1R) 1 is made for the next data transfer.

If, in the step 37, the value of the external memory address register (DEADDR) 5 is larger than the modulo value of the modulo register 11, then a subtraction operation is carried out by subtracting the modulo value from the value of the external memory address register (DEADDR) 5 to find the top transfer address of the next transfer cycle. Subsequently, in the third step 42, the next cycle data transfer is carried out. After the data transfer, in the step 43, the value of the off-set register (DOFF1) 9 is added with the value of the external memory address register (DEADDR) 5. Further, the value of the internal memory address register (DUADDR) 7 is incremented, thereby renewing the next transfer address. In the step 44, the decrement to the value of the transfer word number 1 register (DW1R) 1 is made for the next data transfer. If the value of the transfer word number 1 register (DW1R) is 1, in the step 45, the final data transfer is made to complete the direct memory access transfer.

In accordance with the above embodiment, al of the image data are transferred from the external memory to the internal memory by one time direct memory access transfer This means it possible to reduce the number of interruptions to the CPU, whereby the over-head of the program is reduced to about one third. The number of program lines is also reduced by about 20%.

By contrast to the present invention, in accordance with the conventional direct memory access controller, the data transfer is limited to the unidirection from the lower address to the higher address. In order to transfer the data of the lower address than the just transferred address, it is necessary to once discontinue the direct memory access for subsequent setting data again to the registers, before the next direct memory access transfer is again restarted. Further, it is necessary to send the interruption signal to the CPU in order to notif the CPU of the finish of the direct memory access transfer, during which the CPU discontinues the current operations, whereby the over-hard of the program appears. Actually, in order to carry out one image data processing, it is necessary for the conventional direct memory access controller to send three times the interruption signals to the CPU.

By contrast, in order to carry out one image data processing, it is necessary for the novel direct memory access controller to send one time the interruption signal to the CPU.

It is also necessary for the conventional direct memory access controller to re-write the value of the external memory address register every time when the direct memory access transfer is finished, for which reason 10 times data transfers to the registers are necessary to transfer the one image data.

By contrast to the prior art, in accordance with the present invention, 8 times data transfers to the registers are necessary to transfer the one image data.

Second Embodiment

Figure 7:
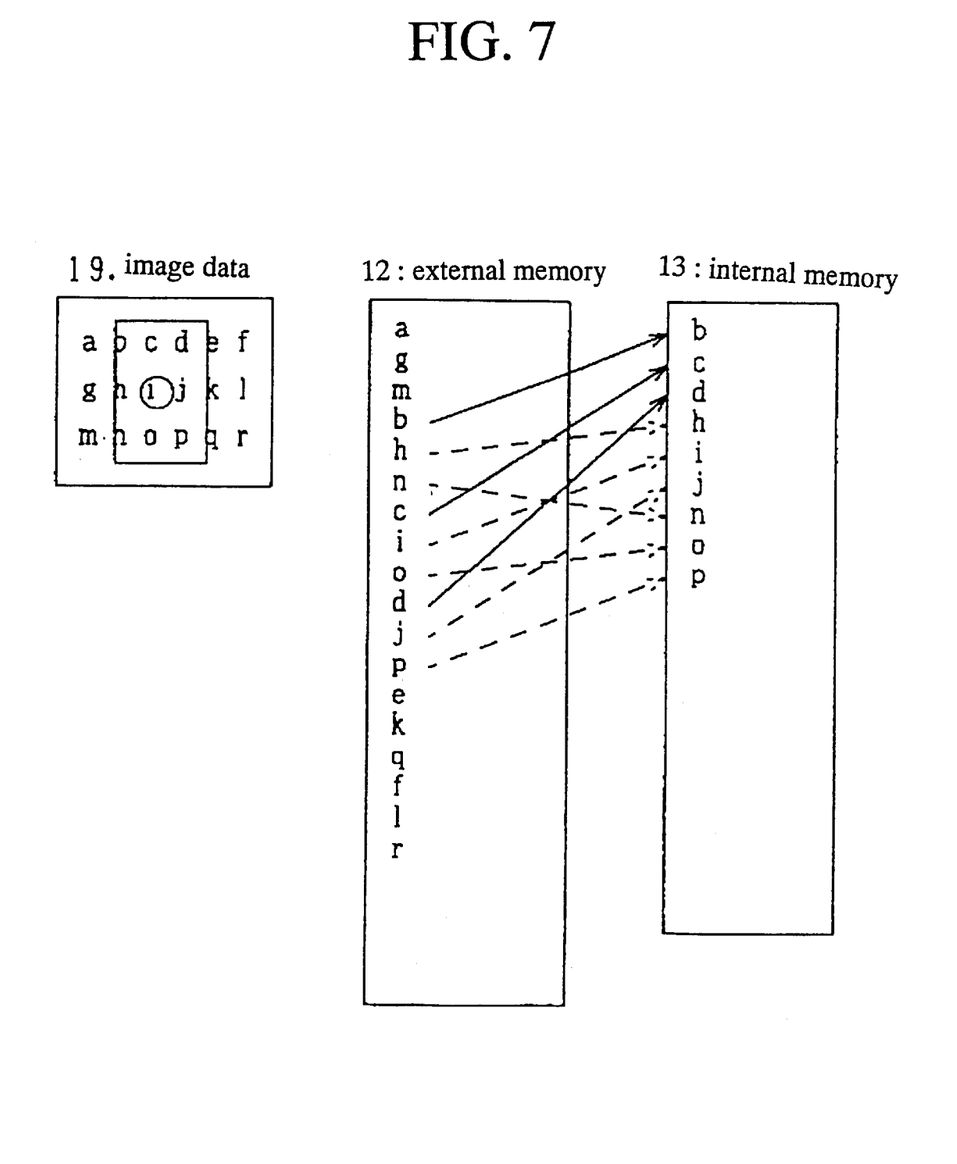
FIG. 7 is a diagram illustrative of a second type data transfer by the first novel direct memory access controller of FIG. 2.
Figure 8:
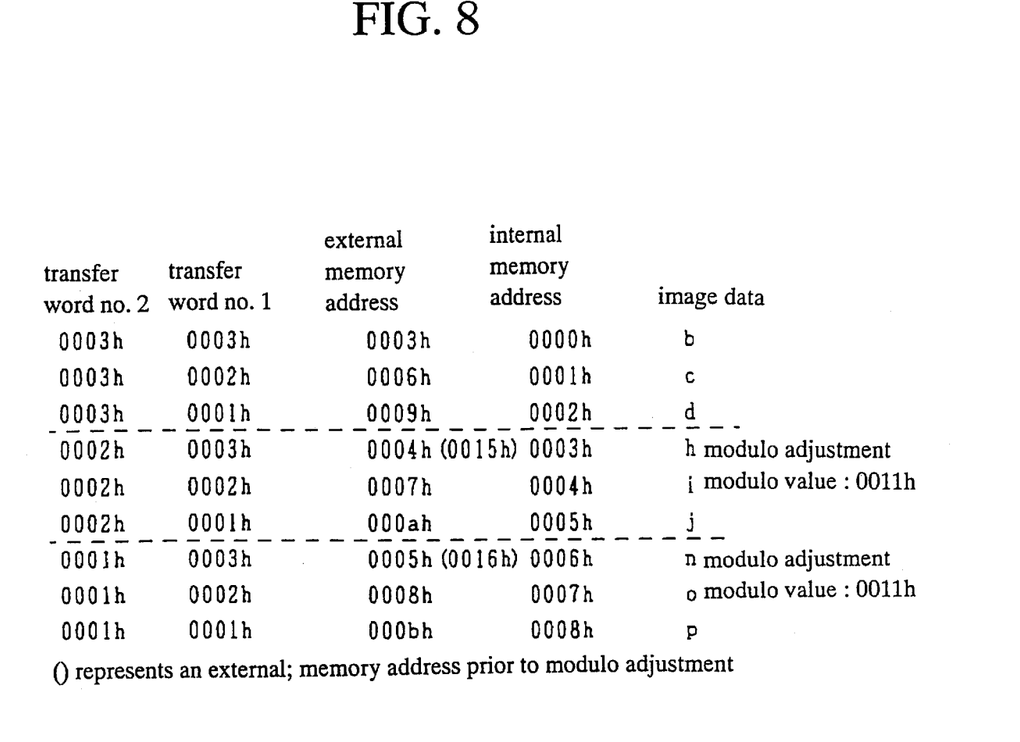
FIG. 8 is a view illustrative of correspondences of individual eighteen image data, internal memory addresses, external memory addresses, transfer word number 1 register and transfer word number 2 register to explain transfer operations of the normal data transfer and modulo adjustment operations.

A second embodiment according to the present invention will be described in detail with reference to the drawings. FIG. 7 is a diagram illustrative of a second type data transfer by the first novel direct memory access controller of FIG. 2. FIG. 8 is a view illustrative of correspondences of individual eighteen image data, internal memory addresses, external memory addresses, transfer word number 1 register and transfer word number 2 register to explain transfer operations of the normal data transfer and modulo adjustment operations.

Operations of the novel direct memory access control unit will be described with reference to FIGS. 7 and 8. The following descriptions will be made assuming that the image data 19 have been stored in the external memory 12 as shown in FIG. 7. In this second embodiment, in order to process the image datum "i", it is necessary to transfer not only the datum "i" but also the data around the datum "i". Namely, in order to process the image datum "i", it is necessary to transfer "bcd", "hij", and "nop" from the external memory 12 to the internal memory 13. Also, the image data 19 are transferred to the internal memory 13 in the alphabetical order. As shown in FIG. 8, initial values are so set that the external memory address register 5 is 0003h, the internal memory address register 7 is 0000h, the off-set 1 register 9 is 0003h, the off-set 2 register 10 is 000ch, the transfer word number 1 register 1: 0003h, the transfer word number 2 register 2: 0003h, the modulo register 11 is 0011h, the direct memory access transfer control register 3 is 0001h.

In the external memory address 12, an image datum "b" is stored at an address represented by "0003h" of the external memory address register 5. This image datum "b" is transferred to the internal memory 13 at an address represented by "0000h" of the internal memory address register 7. After the transfer of the image datum "b" has been completed, then the transfer control circuit 4 executes a decrement or a one-time down-count to the value of the transfer word number 1 register 1 but does not execute the down-count to the value of the transfer word number 2 register 2, whereby the value of the transfer word number 1 register 1 becomes 0002h, whilst the value of the transfer word number 2 register 2 remains 0003h. Further, the external address adder 6 adds the value of the external memory address register 5 with the value of the off-set 1 register 9 selected by the off-set control circuit 14, whereby the value of the external memory address register 5 becomes 0006h. Further more, the internal address adder 8 increments the value of the internal memory address register 7, whereby the value of the internal memory address register 7 becomes 0001h. Thereafter, the image data "c" stored at the external memory address 0006h represented by the external memory address register 5 is then transferred to the internal memory address 0001h represented by the internal memory address register 7. Since the value of the external memory address register 5 is still smaller than the modulo value 0011h, the same operation will be repeated. The above operation will be continued until the value of the transfer word number 1 register 1 becomes 1.

After the transfer of the image datum "c" has been completed, then the transfer control circuit 4 executes a decrement or a one-time downcount to the value of the transfer word number 1 register 1 but does not execute the down-count to the value of the transfer word number 2 register 2, whereby the value of the transfer word number 1 register 1 becomes 0001h, whilst the value of the transfer word number 2 register 2 remains 0003h. Further, the external address adder 6 adds the value of the external memory address register 5 with the value of the off-set 1 register 9 selected by the off-set control circuit 14, whereby the value of the external memory address register 5 becomes 0009h. Further more, the internal address adder 8 increments the value of the internal memory address register 7, whereby the value of the internal memory address register 7 becomes 0002h. Thereafter, the image data "d" stored at the external memory address 0009h represented by the external memory address register 5 is then transferred to the internal memory address 0002h represented by the internal memory address register 7. Since the value of the external memory address register 5 is still smaller than the modulo value 0011h, the same operation will be repeated.

Since the transfer word number 1 register 1 becomes 1, then the transfer control circuit 4 executes a decrement or a one-time down-count to the value of the transfer word number 2 register 2, whereby the value of the transfer word number 2 register 2 becomes 0002h, whilst the initial value "0003h" is re-loaded to the transfer word number 1 register 1 whereby the value of the transfer word number 1 register 1 becomes "0003h". Further, the external address adder 6 adds the value of the external memory address register 5 with the value of the off-set 2 register 10 selected by the off-set control circuit 14, whereby the value of the external memory address register 5 becomes 0015h. Further more, the internal address adder 8 increments the value of the internal memory address register 7, whereby the value of the internal memory address register 7 becomes 0003h. The value of the external memory address register 5 becomes beyond the modulo value 0011h, whereby the external address adder 6 executes such a modulo adjustment that the modulo value 0011h is subtracted from the value 0015h of the external memory address register 5 to obtain a subtracted value 0004h which designates the external memory address as the top transfer address at which the next-transfer image data "h" is stored. Thus, the image data "h" stored at the top transfer address 0004h as the external memory address is then transferred to the internal memory address 0003h represented by the internal memory address register 7. Since the value of the external memory address register 5 after the modulo adjustment becomes smaller than the modulo value 0011h, the same operation will be repeated.

After the transfer of the image datum "h" has been completed, then the transfer control circuit 4 executes a decrement or a one-time down-count to the value of the transfer word number 1 register 1 but does not execute the down-count to the value of the transfer word number 2 register 2, whereby the value of the transfer word number 1 register 1 becomes 0002h, whilst the value of the transfer word number 2 register 2 remains 0002h. Further, the external address adder 6 adds the value of the external memory address register 5 with the value of the off-set 1 register 9 selected by the off-set control circuit 14, whereby the value of the external memory address register 5 becomes 0007h. Further more, the internal address adder 8 increments the value of the internal memory address register 7, whereby the value of the internal memory address register 7 becomes 0004h. Thereafter, the image data "i" stored at the external memory address 0007h represented by the external memory address register 5 is then transferred to the intertal memory address 0004h represented by he internal memory address register 7. Since the value of the external memory address register 5 is still smaller than the modulo value 0011h, the same operation will be repeated.

After the transfer of the image datum "i" has been completed, then the transfer control circuit 4 executes a decrement or a one-time down-count to the value of the transfer word number 1 register 1 but does not execute the down-count to the value of the transfer word number 2 register 2, whereby the value of the transfer word number 1 register 1 becomes 0001h, whilst the value of the transfer word number 2 register 2 remains 0002h. Further, the external address adder 6 adds the value of the external memory address register 5 with the value of the off-set 1 register 9 selected by the off-set control circuit 14, whereby the value of the external memory address register 5 becomes 000ah. Further more, the internal address adder 8 increments the value of the internal memory address register 7, whereby the value of the internal memory address register 7 becomes 0005h. Thereafter, the image data "j" stored at the external memory address 000ah represented by the external memory address register 5 is then transferred to the internal memory address 0005h represented by the internal memory address register 7. Since the value of the external memory address register 5 is still smaller than the modulo value 0011h, the same operation will be repeated.

Since the transfer word number 1 register 1 becomes 1, then the transfer control circuit 4 executes a decrement or a one-time down-count to the value of the transfer word number 2 register 2, whereby the value of the transfer word number 2 register 2 becomes 0001h, whilst the initial value "0003h" is re-loaded to the transfer word number 1 register 1 whereby the value of the transfer word number 1 register 1 becomes "0003h". Further, the external address adder 6 adds the value of he external memory address register 5 with the value of the off-set 2 register 10 selected by the off-set control circuit 14, whereby the value of the external memory address register 5 becomes 0016h. Further more, the internal address adder 8 increments the value of the internal memory address register 7, whereby the value of the internal memory address register 7 becomes 0006h. The value of the external memory address register 5 becomes beyond the modulo value 0011h, whereby the external address adder 6 executes such a modulo adjustment that the modulo value 0011h is subtracted from the value 0016h of the external memory address register 5 to obtain a subtracted value 0005h which designates the external memory address as the top transfer address at which the next-transfer image data "n" is stored. Thus, the image data "n" stored at the top transfer address 0005h as the external memory address is then transferred to the internal memory address 0006h represented by the internal memory address register 7. Since the value of the external memory address register 5 after the modulo adjustment becomes smaller than the modulo value 0011h, the same operation will be repeated.

After the transfer of the image datum "n" has been completed, then the transfer control circuit 4 executes a decrement or a one-time downcount to the value of the transfer word number 1 register 1 but does not execute the down-count to the value of the transfer word number 2 register 2, whereby the value of the transfer word number 1 register 1 becomes 0002h, whilst the value of the transfer word number 2 register 2 remains 0001h. Further, the external address adder 6 adds the value of the external memory address register 5 with the value of the off-set 1 register 9 selected by the off-set control circuit 14, whereby the value of the external memory address register 5 becomes 0008h. Further more, the internal address adder 8 increments the value of the internal memory address register 7, whereby the value of the internal memory address register 7 becomes 0007h. Thereafter, the image data "o" stored at the external memory address 0008h represented by the external memory address register 5 is then transferred to the internal memory address 0007h represented by the internal memory address register 7. Since the value of the external memory address register 5 is still smaller than the modulo value 0011h, the same operation will be repeated.

After the transfer of the image datum "o" has been completed, then the transfer control circuit 4 executes a decrement or a one-time down-count to the value of the transfer word number 1 register 1 but does not execute the down-count to the value of the transfer word number 2 register 2, whereby the value of the transfer word number 1 register 1 becomes 0001h, whilst the value of the transfer word number 2 register 2 remains 0001h. Further, the external address adder 6 adds the value of the external memory address register 5 with the value of the off-set 1 register 9 selected by the off-set control circuit 14, whereby the value of the external memory address register 5 becomes 000bh. Further more, the internal address adder 8 increments the value of the internal memory address register 7, whereby the value of the internal memory address register 7 becomes 0008h. Thereafter, the image data "p" stored at the external memory address 000bh represented by the external memory address register 5 is then transferred to the internal memory address 0008h represented by the internal memory address register 7, whereby the direct memory access transfer of the image data "bcd", "hij", and "nop" has been completed, and concurrently the direct memory access controller sends an interruption signal 15 to the CPU so as to notify that the direct memory access transfer has been completed.

Figure 9:
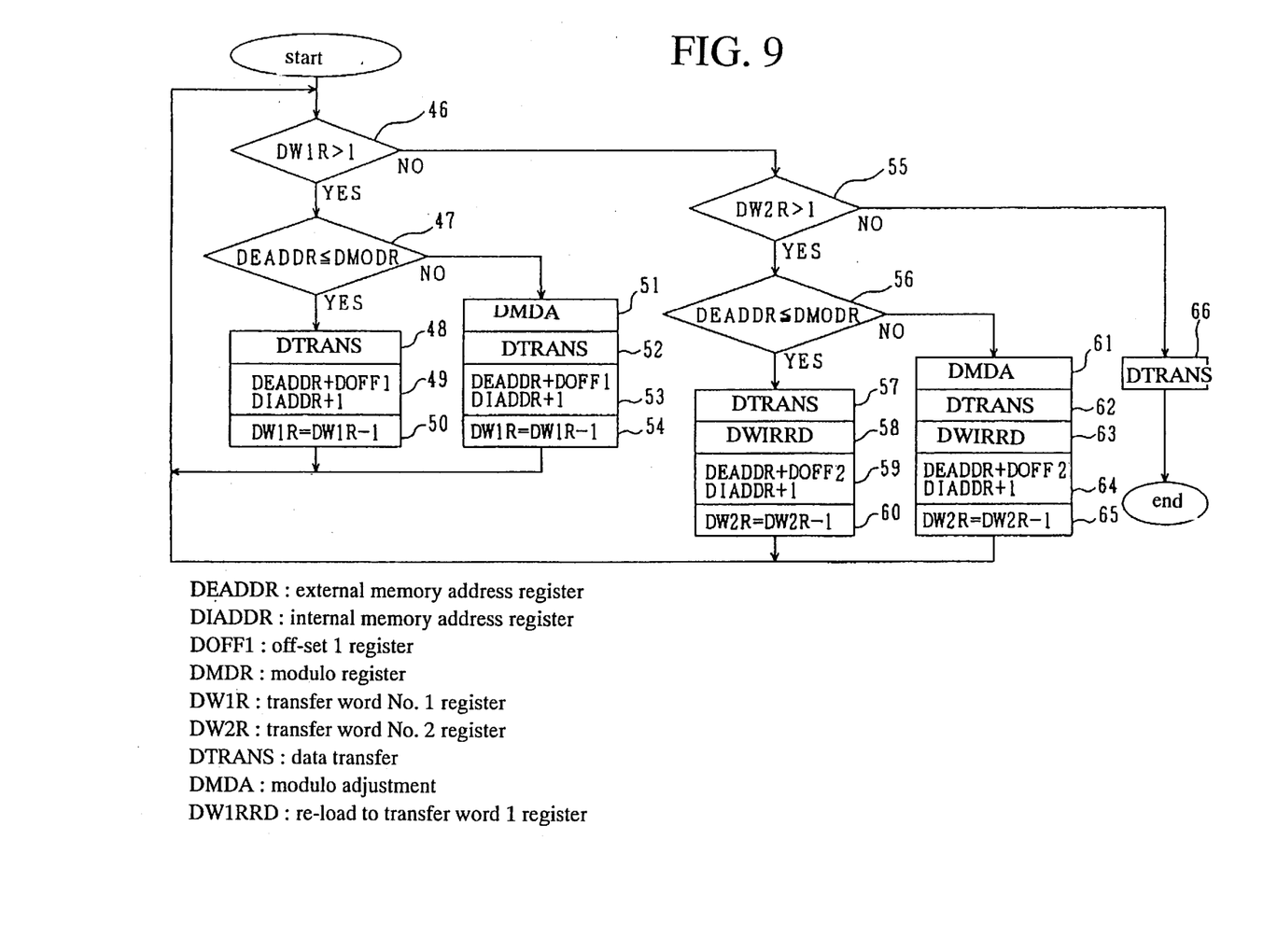
FIG. 9 is a flow chart illustrative of operations of the first novel direct memory access transfer controller of FIG. 2 in this second embodiment.

FIG. 9 is a flow chart illustrative of operations of the first novel direct memory access transfer controller of FIG. 2 in this second embodiment. As described above, in order to start the direct memory access transfer, initial values are so set that the external memory address register 5 is 0003h, the internal memory address register 7 is 0000h, the off-set 1 register 9 is 0003h, the off-set 2 register 10 is 000ch, the transfer word number 1 register 1: 0003h, the transfer word number 2 register 2:0003h, the modulo register 11 is 0011h, the direct memory access transfer control register 3 is 0001h.

In the first step 46, it is confirmed whether or not the value of the transfer word number 1 register (DW1R) 1 is more than 1. If the value is more than 1, then in the second step 47, it is further confirmed whether or not the value of the external memory address register (DEADDR) 5 is smaller or equal to the modulo value of the modulo register 11. If the value is smaller or equal to the modulo value, then in the third step 48, a data transfer is carried out. After the data transfer, in the step 49, the value of the off-set register (DOFF1) 9 is added with the value of the external memory address register (DEADDR) 5. Further, the value of the internal memory address register (DUADDR) 7 is incremented, thereby renewing the next transfer address. In the step 50, the decrement to the value of the transfer word number 1 register (DW1R) 1 is made for the next data transfer.

If, in the step 47, the value of the external memory address register (DEADDR) 5 is larger than the modulo value of the modulo register 11, then in the step 51, a subtraction operation is carried out by subtracting the modulo value from the value of the external memory address register (DEADDR) 5 to find the top transfer address of the next transfer cycle. Subsequently, in the third step 52, the next cycle data transfer is carried out. After the data transfer, in the step 53, the value of the off-set register (DOFF1) 9 is added with the value of the external memory address register (DEADDR) 5. Further, the value of the internal memory address register (DUADDR) 7 is incremented, thereby renewing the next transfer address. In the step 54, the decrement to the value of the transfer word number 1 register (DW1R) 1 is made for the next data transfer. If the value of the transfer word number 1 register (DW1R) 1 is 1 or 0, in the step 55, it is confirmed whether or not the value of the transfer word number 2 register (DW2R) 2 is more than 1. If the value is more than 1, then in the step 56, it is further confirmed whether or not the value of the external memory address register (DEADDR) 5 is smaller or equal to the modulo value of the modulo register 11. If the value is smaller or equal to the modulo value, then in the third step 57, a data transfer is carried out. After the data transfer, in the step 58, the initial value is re-loaded to the transfer word number 1 register (DW1R) 1. In the step 59, the value of the off-set register (DOFF1) 9 is added with the value of the external memory address register (DEADDR) 5. Further, the value of the internal memory address register (DUADDR) 7 is incremented, thereby renewing the next transfer address. In the step 60, the decrement to the value of the transfer word number 1 register (DW1R) 1 is made for the next data transfer. Further, the decrement to the value of the transfer word number 2 register (DW2R) 2 is made for the next data transfer.

If, in the step 56, the value of the external memory address register (DEADDR) 5 is larger than the modulo value of the modulo register 11, then in the step 61, a subtraction operation is carried out by subtracting the modulo value from the value of the external memory address register (DEADDR) 5 to find the top transfer address of the next transfer cycle. Subsequently, in the step 62, the next cycle data transfer is carried out. After the data transfer, in the step 62, the initial value is re-loaded to the transfer word number 1 register (DW1R) 1. In the step 64, the value of the off-set register (DOFFL) 9 is added with the value of the external memory address register (DEADDR) 5. Further, the value of the internal memory address register (DUADDR) 7 is incremented, thereby renewing the next transfer address. In the step 65, the decrement to the value of the transfer word number 1 register (DOWR) 1 is made for the next data transfer If the value of the transfer word number 1 register (DW1R) is 1 or 0, in the step 46, it is confirmed whether or not the value of the transfer word number 2 register (DW1R) 2 is more than 1. If the value is 1 or 0, then in the step 66, the final data transfer is made to complete the direct memory access transfer.

In accordance with the above embodiment, al of the image data are transferred from the external memory to the internal memory by one time direct memory access transfer. This means it possible to reduce the number of interruptions to the CPU, whereby the over-head of the program is reduced to about one third. The number of program lines is also reduced by about 20%.

By contrast to the present invention, in accordance with the conventional direct memory access controller, the data transfer is limited to the unidirection from the lower address to the higher address. In order to transfer the data of the lower address than the just transferred address, it is necessary to once discontinue the direct memory access for subsequent setting data again to the registers, before the next direct memory access transfer is again re-started. Further, it is necessary to send the interruption signal to the CPU in order to notify the CPU of the finish of the direct memory access transfer, during which the CPU discontinues the current operations, whereby the over-hard of the program appears. Actually, in order to carry out one image data processing, it is necessary for the conventional direct memory access controller to send three times the interruption signals to the CPU.

By contrast, in order to carry out one image data processing, it is necessary for the novel direct memory access controller to send one time the interruption signal to the CPU.

It is also necessary for the conventional direct memory access controller to re-write the value of the external memory address register every time when the direct memory access transfer is finished, for which reason 10 times data transfers to the registers are necessary to transfer the one image data By contrast to the prior art, in accordance with the present invention, 8 times data transfers to the registers are necessary to transfer the one image data.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which fall within the spirit and scope of the present invention.

What is claimed is:

1. A direct memory access device for use in connection with an external memory and an internal memory, the external memory containing a block of data, the external memory being addressed so that sequential addresses correspond to columns of the block of data, comprising:

a means for transferring a sub-block of the block of data, said sub-block being smaller than the block of data, from the external memory to the internal memory by sequentially reading in row order across the columns of the block of data, the means for transferring comprising a first offset register set with a first value used to increment successive read addresses while traversing a row, and a second offset register set with a second value different from the first value used to increment successive read addresses from the end of a current row to a first address in a following row.

2. The device of claim 1, wherein the means for transferring further comprises:

an external address register;

an external address adder connected to the external address register;

an offset controller connected to each of the first and second offset registers and the external adder; and a transfer control circuit connected to the offset controller, the external address register, and the external address adder, wherein the transfer control circuit is constructed to control whether the offset controller provides the value of the first or second offset register to the external address adder to increment the value in the external register.

3. The device of claim 2, further comprising a modulo register connected to the external address adder, wherein the transfer control circuit is constructed to cause the external address adder to decrement the value in he external address register by the value of the modulo register to point to a first address in a following row.

4. The device of claim 3, further comprising a first transfer word number register connected to the transfer control circuit, wherein the transfer control circuit is constructed to decrement a value stored in he first transfer word number register in connection with successive transfers within a given said row, and reset the value stored in the first transfer word number register in connection with adjusting the value stored in the external address register to point to a first address in a new said row.

5. The device of claim 4, further comprising a second transfer word number register connected to the transfer control circuit, wherein the transfer control circuit is constructed to decrement a value stored in the second transfer word number register in conjunction with said resetting of the value stored in the first transfer word number register.

6. A method of transferring a sub-block of data by rows from a block of data in an external memory device that is addressed by columns, the sub-block being x columns by y rows, the block of data comprising at least one of a number of columns greater than x and a number of rows greater than y, comprising the steps of:

providing a direct memory access device comprising first and second offset registers, a modulo register, and an external memory address register;

transferring a row of data within the sub-block from the external memory device by successive read operations from address locations in the external memory device represented by successive values stored in the external memory address register;

resetting the external memory address register to point to a first address in a row within the sub-block of the external memory device immediately following the previously transferred row of data; and repeating the row transfer and resetting steps until the entire sub-block has been transferred, with the sub-block having at least one of a number of said rows and a number of said columns that is less than a number of said rows and a number of said columns in the block, respectively.

7. The method of claim 6, wherein she row transfer step includes incrementing the value stored in the external memory address register by the value stored in the first offset register in connection with each said read operation.

8. The method of claim 7, wherein the row transfer step further includes incrementing the value stored in the external memory address register by the value stored in the second offset register in connection with a final said read operation for a given said row.

9. The method of claim 8, wherein the row transfer step further includes decrementing the value scored in the external memory address register by the value stored in the modulo register in connection with a first said read operation for a given said row following a first said row.

10. The method of claim 9, further including providing an internal memory address register, and wherein the row transfer step further includes, in conjunction with each said read operation from the external memory device, writing the data read from the external memory device to an address in the internal memory device represented by the value stored in the internal memory address register.

11. The method of claim 10, wherein the row transfer step further includes incrementing the value stored in the internal memory address register.

12. The method of claim 9, further including providing a first transfer word number register, wherein the row transfer step further includes decrementing the first transfer word number register in connection with each said read operation.

13. The method of claim 12, further including providing a second transfer word number register, wherein the row transfer step further includes decrementing the second transfer word number register in connection with each row transfer.

14. The method of claim 6, further comprising the step of, prior to the first execution of the row transfer step, setting the modulo register to have a value based on a number of memory locations in the block of data.

15. The method of claim 6, further comprising the step of, prior to the first execution of the row transfer step, setting the first offset register to have a value corresponding to a number of rows in the block of data.

* * * * *